(12) United States Patent
Zhang

(10) Patent No.: US 6,984,287 B2
(45) Date of Patent: Jan. 10, 2006

(54) PRIMER COMPOSITION FOR PROMOTING ADHESION OF A URETHANE ADHESIVE TO A POLYMERIC SUBSTRATE

(75) Inventor: Chunbin Zhang, Fremont, CA (US)

(73) Assignee: The Dow Chemical Company

( * ) Notice: Subject to any disclaimer, the term of this patent is extended or adjusted under 35 U.S.C. 154(b) by 529 days.

(21) Appl. No.: 10/001,019

(22) Filed: Nov. 2, 2001

(65) Prior Publication Data

US 2003/0084995 A1 May 8, 2003

(51) Int. Cl.
*C09J 5/02* (2006.01)

(52) U.S. Cl. .............................. 156/331.4; 156/331.7; 156/332; 156/108; 524/589; 524/590

(58) Field of Classification Search ............. 156/331.4, 156/331.7, 332, 108; 524/589, 590
See application file for complete search history.

(56) References Cited

U.S. PATENT DOCUMENTS

| | | |
|---|---|---|
| 2,891,876 A | 6/1959 | Brown |
| 3,023,126 A | 2/1962 | Underwood |
| 3,152,162 A | 10/1964 | Fischer et al. |
| 3,212,920 A | 10/1965 | Chapman |
| 3,240,620 A | 3/1966 | Atwell |
| 3,453,243 A | 7/1969 | Hartlein |
| 3,459,584 A | 8/1969 | Caldwell |
| 3,502,704 A | 3/1970 | McKellar |
| 3,616,187 A | 10/1971 | Ottmann et al. |

(Continued)

FOREIGN PATENT DOCUMENTS

| | | |
|---|---|---|
| DE | 1119949 | 7/1968 |
| EP | 0158893 | 10/1985 |
| EP | 0395228 | 10/1990 |
| EP | 0447998 | 9/1991 |
| EP | 0686655 | 12/1995 |
| EP | 0877059 | 11/1998 |
| EP | 0976723 | 2/2000 |
| GB | 1 540 634 | 2/1979 |
| JP | 2120082 | 10/1994 |
| JP | 2121959 | 10/1994 |
| JP | 2507127 B2 * | 6/1996 |
| WO | WO 92/222619 | 12/1992 |
| WO | WO 95/11927 | 5/1995 |
| WO | WO 98/15601 | 4/1998 |
| WO | WO 98/50445 | 11/1998 |

OTHER PUBLICATIONS

Literature entitled Ciba UVITEX OB–ONE, Fluorescent Whitening Agent, Ciba, Ciba Speciality Chemicals, pp. 1–2, Jan. 2000.
Derwent Abstract JP 59207237, Nov. 24, 1984.
Derwent Abstract JP 53023335, Mar. 3, 1978.
Derwent Abstract JP 50058135, May 20, 1975.
Derwent Abstract JP 58185675, Oct. 29, 1983.
Derwent Abstract JP 05148456, Jun. 15, 1993.
Derwent Abstract JP 06157736, Jun. 7, 1994.
Derwent Abstract JP 08099387, Apr. 16, 1996.
Derwent Abstract JP 08209067, Aug. 13, 1996 and JP 2899788, Jun. 2, 1999.
Derwent Abstract JP 07332681, Dec. 17, 1996.
Derwent Abstract JP 10286931, Oct. 27, 1998.
Derwent Abstract, JP 63225682, Sep. 20, 1988 and JP 02002911, Jan. 19, 1990.

*Primary Examiner*—Sam Chuan Yao
(74) *Attorney, Agent, or Firm*—Dobrusin & Thennisch PC

(57) ABSTRACT

There is disclosed a primer composition for promoting adhesion between a polymeric substrate and an adhesive. The primer composition may include, without limitation, a resin, an isocyanate, a catalyst, a solvent and optionally an optical brightener.

21 Claims, 1 Drawing Sheet

U.S. PATENT DOCUMENTS

| | | | |
|---|---|---|---|
| 3,616,191 A | | 10/1971 | Fuerholzer |
| 3,627,722 A | | 12/1971 | Seiter |
| 3,632,417 A | | 1/1972 | Brasen |
| 3,656,998 A | | 4/1972 | Ottmann |
| 3,658,763 A | | 4/1972 | Dehm |
| 3,707,521 A | | 12/1972 | Santis |
| 3,743,617 A | | 7/1973 | Kest |
| 3,756,845 A | | 9/1973 | Zasadny |
| 3,758,334 A | | 9/1973 | Dehm |
| 3,764,365 A | | 10/1973 | Duncan |
| 3,779,794 A | | 12/1973 | De Santis |
| 3,838,093 A | | 9/1974 | Owston |
| 3,879,248 A | | 4/1975 | Kest |
| 3,892,895 A | | 7/1975 | Toogoo et al. |
| 3,960,088 A | | 6/1976 | Greever |
| 3,962,498 A | | 6/1976 | Owston |
| 4,020,049 A | | 4/1977 | Rinehart |
| 4,138,527 A | | 2/1979 | Malek |
| 4,177,099 A | | 12/1979 | Radzwill |
| 4,242,415 A | | 12/1980 | Feltzin et al. |
| 4,275,099 A | | 6/1981 | Dani |
| 4,282,285 A | | 8/1981 | Mohiuddin |
| 4,349,643 A | | 9/1982 | Mohiuddin |
| 4,385,133 A | | 5/1983 | Alberino et al. |
| 4,418,183 A | | 11/1983 | Chiang |
| 4,443,518 A | | 4/1984 | Martins et al. |
| 4,443,519 A | | 4/1984 | Donermeyer et al. |
| 4,503,175 A | | 3/1985 | Houze et al. |
| 4,522,879 A | | 6/1985 | Krueger |
| 4,522,975 A | | 6/1985 | O'Connor et al. |
| 4,542,070 A | | 9/1985 | Ohtani et al. |
| 4,554,318 A | | 11/1985 | Rukavina |
| 4,576,855 A | | 3/1986 | Okina et al. |
| 4,578,418 A | | 3/1986 | Krueger |
| 4,582,873 A | | 4/1986 | Gaa et al. |
| 4,609,703 A | | 9/1986 | Rukavina |
| 4,623,686 A | | 11/1986 | Hurnik et al. |
| 4,624,996 A | | 11/1986 | Rizk et al. |
| 4,625,012 A | | 11/1986 | Rizk et al. |
| 4,639,384 A | | 1/1987 | Umemoto et al. |
| 4,643,794 A | * | 2/1987 | Saracsan et al. ............. 156/310 |
| 4,654,257 A | | 3/1987 | Murachi |
| 4,670,350 A | | 6/1987 | Rukavina |
| 4,694,051 A | | 9/1987 | Kordomenos et al. |
| 4,707,381 A | | 11/1987 | Toyama et al. |
| 4,719,267 A | | 1/1988 | Rizk et al. |
| 4,729,914 A | | 3/1988 | Kliment et al. |
| 4,758,648 A | | 7/1988 | Rizk et al. |
| 4,766,177 A | | 8/1988 | Miller et al. |
| 4,778,845 A | | 10/1988 | Tschan et al. |
| 4,780,520 A | | 10/1988 | Rizk et al. |
| 4,789,600 A | | 12/1988 | Treibs et al. |
| 4,804,734 A | | 2/1989 | Vu et al. |
| 4,913,970 A | | 4/1990 | Hayward et al. |
| 4,963,636 A | | 10/1990 | Mulhaupt et al. |
| 5,019,440 A | | 5/1991 | Ogasawara |
| 5,030,513 A | | 7/1991 | Hartman |
| 5,030,514 A | | 7/1991 | Hartman |
| 5,043,379 A | | 8/1991 | Ota et al. |
| 5,045,393 A | | 9/1991 | Kumanoya et al. |
| 5,057,568 A | | 10/1991 | Nowicki et al. |
| 5,075,171 A | | 12/1991 | Kondo et al. |
| 5,079,098 A | * | 1/1992 | Liu ............................. 428/522 |
| 5,102,937 A | | 4/1992 | Warren et al. |
| 5,114,789 A | | 5/1992 | Reafler |
| 5,115,086 A | | 5/1992 | Hsieh |
| 5,132,148 A | | 7/1992 | Reafler |
| 5,139,854 A | | 8/1992 | Johnson |
| 5,154,792 A | | 10/1992 | Patterson |
| 5,167,706 A | | 12/1992 | Kuszaj |
| 5,167,899 A | | 12/1992 | Jezic |
| 5,190,607 A | | 3/1993 | Werner et al. |
| 5,205,963 A | | 4/1993 | Brito et al. |
| 5,238,993 A | | 8/1993 | Hsieh |
| 5,242,751 A | | 9/1993 | Hartman |
| 5,258,444 A | | 11/1993 | Zezinka et al. |
| 5,270,362 A | | 12/1993 | Palmer |
| 5,286,528 A | | 2/1994 | Reafler |
| 5,300,326 A | | 4/1994 | Zezinka et al. |
| 5,334,420 A | | 8/1994 | Hartung et al. |
| 5,368,943 A | | 11/1994 | Baghdachi |
| 5,387,642 A | | 2/1995 | Blum et al. |
| 5,415,750 A | | 5/1995 | Klein et al. |
| 5,466,727 A | | 11/1995 | Hsieh |
| 5,468,317 A | | 11/1995 | Hsieh |
| 5,492,951 A | | 2/1996 | Beyrle |
| 5,567,530 A | | 10/1996 | Drujon et al. |
| 5,603,798 A | | 2/1997 | Bhat |
| 5,608,000 A | | 3/1997 | Duan et al. |
| 5,610,232 A | | 3/1997 | Duan et al. |
| 5,618,904 A | * | 4/1997 | Martin et al. .................. 528/73 |
| 5,670,599 A | | 9/1997 | Bassner |
| 5,747,581 A | | 5/1998 | Proebster et al. |
| 5,759,324 A | | 6/1998 | Roth et al. |
| 5,759,631 A | | 6/1998 | Rink et al. |
| 5,776,548 A | | 7/1998 | Rukavina et al. |
| 5,792,811 A | | 8/1998 | Bhat |
| 5,807,919 A | | 9/1998 | Duan et al. |
| 5,807,924 A | | 9/1998 | Becker et al. |
| 5,840,429 A | | 11/1998 | Rukavina et al. |
| 5,852,137 A | | 12/1998 | Hsieh et al. |
| 5,864,996 A | | 2/1999 | Veldman et al. |
| 5,872,182 A | | 2/1999 | Duan et al. |
| 5,929,160 A | | 7/1999 | Krepski et al. |
| 5,972,158 A | | 10/1999 | Hoffmann et al. |
| 5,973,045 A | | 10/1999 | Dowling et al. |
| 5,994,452 A | | 11/1999 | Rukavina et al. |
| 6,001,924 A | | 12/1999 | Dobert et al. |
| 6,008,305 A | | 12/1999 | Wang et al. |
| 6,031,045 A | | 2/2000 | Wei et al. |
| 6,051,314 A | | 4/2000 | Girgis |
| 6,063,890 A | | 5/2000 | Tye |
| 6,080,488 A | | 6/2000 | Hostettler et al. |
| 6,110,327 A | | 8/2000 | Rukavina et al. |
| 6,133,398 A | | 10/2000 | Bhat et al. |
| 6,140,420 A | | 10/2000 | Sehanobish et al. |
| 6,153,699 A | | 11/2000 | Matsuda et al. |
| 6,162,862 A | | 12/2000 | Grunbauer et al. |
| 6,184,286 B1 | | 2/2001 | Edwards et al. |
| 6,211,285 B1 | | 4/2001 | Grunbauer et al. |
| 6,277,903 B1 | | 8/2001 | Sophiea et al. |
| 6,281,393 B1 | | 8/2001 | Molina et al. |
| 2002/0072562 A1 | * | 6/2002 | Asthana ..................... 524/560 |
| 2003/0159264 A1 | | 8/2003 | McLeod et al. |

* cited by examiner

PRIMER COMPOSITION FOR PROMOTING ADHESION OF A URETHANE ADHESIVE TO A POLYMERIC SUBSTRATE

TECHNICAL FIELD

The present invention relates to a primer composition for priming a substrate surface to increase adhesion to such a surface. More particularly, this invention relates to a primer composition for priming a substrate surface such as a plastic substrate surface to increase the adhesion of a sealant composition to such a surface.

BACKGROUND OF THE INVENTION

Urethane sealants and adhesives are known to provide high tensile strengths and tear strengths when used to bond materials. However, certain urethane sealants may not form a bond with desired strength or durability characteristics when they are bonded to polymers or plastics. As an example, windshields or other glass components of automotive vehicles may include polyvinylchloride (PVC) or reaction injection molded (RIM) frames that are secured to other vehicle components with urethane adhesives and the adhesives may not bond to such frames with a desired amount of strength or durability.

The present invention provides a primer composition for promoting of sealants or adhesives to plastics or other substrates.

SUMMARY OF THE INVENTION

According to the method a primer composition is provided. The primer composition includes a resin selected from the group consisting of an acrylic resin, a polyester resin and combinations thereof. The resin is present in an amount of about 2 to about 10 parts by weight of the primer composition. The primer composition also includes a polyisocyanate in an amount of about 3 to about 30 parts by weight of the primer composition. A catalyst is also included in the primer composition in an amount of about 0.05 to about 2 parts by weight of the primer composition. The primer composition further includes a solvent in an amount of about 30 to about 80 parts by weight of the primer composition. Once provided, the primer composition is contacted with a substrate.

The present invention also provides a novel method for bonding a substrate that at least partially encapsulates a transparent sheet. According to the method, a transparent sheet assembly is provided including a transparent sheet at least partially encapsulated with a seal. The seal of the assembly is contacted with a primer composition. The primer composition includes a resin selected from the group consisting of an acrylic resin, a polyester resin and combinations thereof wherein the resin is present in an amount up to about 10 parts by weight of the primer composition. The primer composition also includes a polyisocyanate in an amount up to about 3 to about 30 parts by weight of the primer composition. A catalyst is present in the primer composition in an amount of about 0.05 to about 2 by weight of the primer composition. Moreover, a solvent is provided in the primer composition. The primer composition is contacted with a polyurethane adhesive and the polyurethane adhesive is contacted with an automotive vehicle member for bonding the transparent sheet assembly to the automotive vehicle member.

The present invention also provides a novel primer composition for promoting adhesion of a urethane adhesive to a polymeric substrate. The primer composition includes a methacrylate resin wherein the resin is present in an amount from about 3 to about 8 parts by weight of the primer composition. One or more polyisocyanates are present in the primer composition in an amount from about 3 to about 30 parts by weight of the primer composition. At least one polyisocyanate is preferably a thiophosphate with a isocyanate group. The primer composition also includes a catalyst in an amount of about 0.05 to about 2 parts by weight of the primer composition wherein the catalyst includes at least one tin compound. A solvent is present in the primer composition in an amount from about 60 parts by weight to about 80 parts by weight.

DETAILED DESCRIPTION OF THE PREFERRED EMBODIMENT

Figure 1:
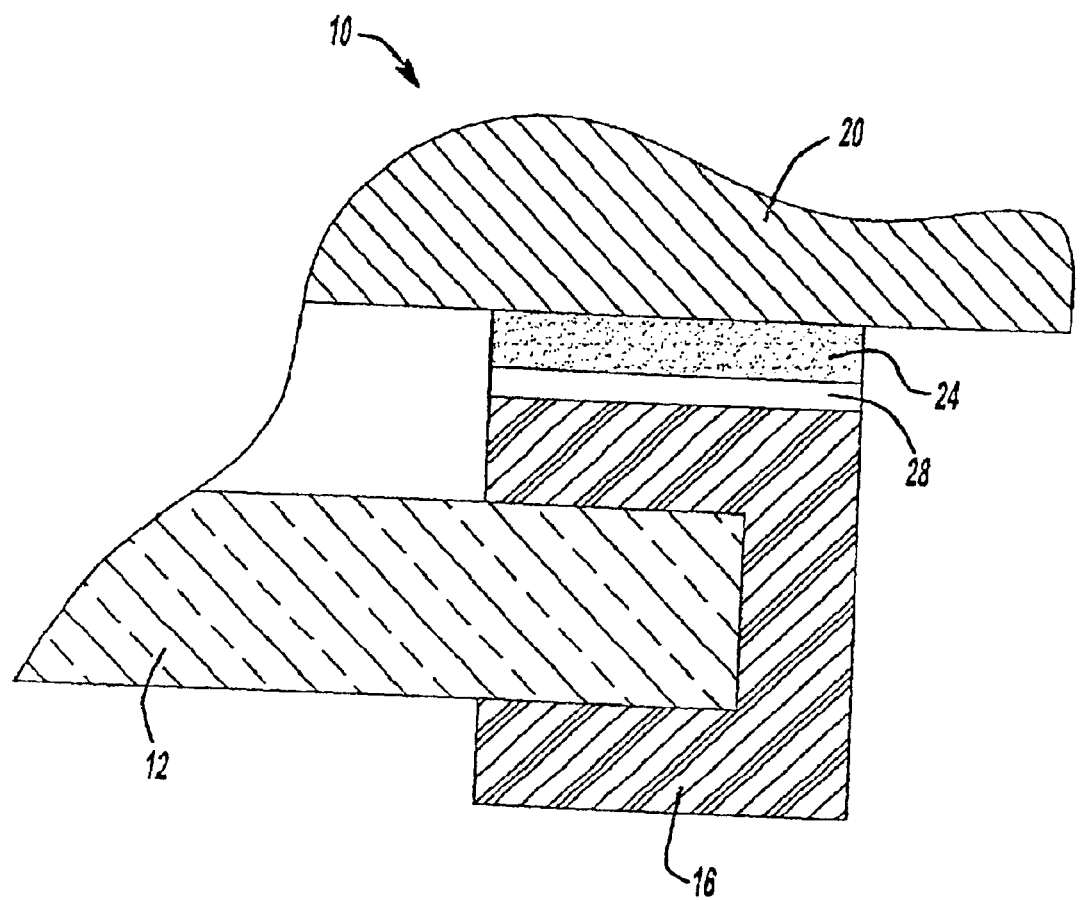
FIG. 1 is a sectional view of an exemplary laminate for connecting a glass window of an automotive vehicle to a coated metal panel of the vehicle.

Generally speaking, the present invention provides a primer composition for promoting adhesion between a urethane adhesive and a surface of an article, such as that made of a plastic or otherwise including a polymeric component as a major component. Preferably, the primer composition exhibits improved adhesion durability and strength for urethane adhesives even when the adhesives are exposed to heat, humidity, liquid submersion or a combination thereof.

In a first aspect of the present invention, the primer composition includes:

1) a resin;
2) an isocyanate;
3) a catalyst; and
4) a solvent.

One or more resins are typically present in the primer composition for assisting the composition in forming a film, and preferably one that is ultimately disposed intermediate an adhesive and a surface of an article. The amount of resin present in the primer composition ranges up to about 35% by weight of the primer composition, more preferably from 0.1% by weight to about 20% by weight of the primer composition, still more preferably from about 1% to about 10% by weight, and even still more preferably from about 3% to about 8% by weight.

Particularly preferred resins useful for the primer composition include, without limitation, acrylic resins, polyester resins or a mixture thereof.

Examples of suitable acrylic resins include, without limitation, those including one or more of methyl acrylate (MA), methyl methacrylate (MMA), ethyl acrylate (EA), butyl methacrylate (BMA), n-butyl methacrylate (nBMA), Acrylic Acid, Butyl Acrylate, Cyclohexyl Acrylate (CHA), 2-Ethylhexyl Acrylate (2-EHA), Isobornyl Acrylate (IBXA), Isobutyl Acrylate ( BA), Isostearyl Acrylate OSTA), Cyclohexyl Methacrylate (CHMA), Diethylaminoethyl Methacrylate (DEMA), Dimethylaminoethyl Methacrylate (DMMA), Ethyleneglycol Dimethacrylate (FDMA), Glycidyl Methacrylate (GMA), Isobornyl Methacrylate (IBXMA), Isobutyl Methacrylate (I-BMA), Lauryl Methacrylate (LMA), Methacrylamide, Methacrylic Acid (MAA), Methyl Methacrylate (MMA) and Tert-Butyl Methacrylate (T-BMA) or mixtures thereof.

Molecular weights of the acrylic resins preferably range from about 15,000 to about 250,000 amu, more preferably from about 60,000 to about 160,000 amu, and still more preferably from about 100,000 to about 130,000 amu. Glass transition temperatures for the acrylic resins preferably range from about 60° C. to about 180° C., more preferably from about 80° C. to about 130° C., and still more preferably from about 100° C. to about 110° C. One highly preferred acrylic resin is a methylmethacrylate (MMA) based resin with a molecular weight of about 120,000 amu and a glass transition temperature of about 105° C. such as PARALOID A-21, commercially available from Rohmn and Haas Company, Philadelphia, Pa.

One or more suitable polyester resins may be present alone or in combination in the primer composition and may be chosen from a variety of saturated or unsaturated polymer resins having ester groups. In one embodiment, the polyester resin is comprised of a carboxylic acid and a glycol component. The polyester resin preferably has a molecular weight up to about 150,000, more preferably from about 10,000 to about 100,000, and still more preferably from about 15,000 to about 50,000. The polyester resin preferably has a glass transition temperature, which is in the range of from about 20 ° C. to about 100 ° C., more preferably about 55° C. to about 70° C. and still more preferably about 63 ° C. This polyester resin is preferably a polymer of at least one aromatic dicarboxylic acid or alkyl ester thereof, and at least one glycol compound. The preparation of these polyester resins is described, for example, in U.S. Pat. No. 3,459,584, column 2, line 40 to column 4, line 3: and U.S. Pat. Nos. 4,020,049 and 4,418,183, which are hereby incorporated by reference in their entirety. Preferred aromatic dicarboxylic acids include 1,3-benzenedicarboxylic acid and 1,4-benzenedicarboxylic acid. Preferred glycols include 1,2-ethanediol. In a highly preferred embodiment, the polyester resin is a condensation polymerization product of mixtures of glycols and dibasic organic acids, simple esters or both. One exemplary polyester resin is sold under the tradename VITEL 2300 BU and is commercially available from Bostik Findley Corporation, Middleton, Mass.

One or more isocyanates may be present in the primer composition for assisting in promoting the adhesion of the adhesive to the plastic component. Amounts of isocyanate present in the primer composition may range up to about 50% by weight, and more preferably from about 5% to about 45% by weight. Even more preferably, the isocyanate is present in the composition from about 10% to about 40% by weight and more preferably from about 15% to about 30% by weight.

Isocyanates of the primer composition may be monoisocyanates, polyisocyanates or a combination thereof. The iscocyanates may be aromatic, aliphatic or cycloaliphatic. Exemplary monoisocyanates include, without limitation, isophorone monoisocyanate, 3,5- dimethylphenyl isocyanate, paratoluenesulfonyl monoisocyanate.

Exemplary polyisocyanates may include diisocyanates. Representative examples of these diisocyanates can be found in U.S. Pat. Nos. 4,385,133; 4,522,975; and 5,167,899, the disclosure of which diisocyanates are incorporated herein by reference. Other diisocyanates include 4,4'-diisocyanatodiphenylmethane, p-phenylene diisocyanate, 1,3-bis(isocyanatomethyl)-cyclohexane, 1,4-diisocyanatocyclohexane, hexamethylene diisocyanate, 1,5-naphthalene diisocyanate, 3,3'-dimethyl-4,4'-biphenyl diisocyanate, 4,4'-diisocyanatodicyclohexylmethane, and 2,4-toluene diisocyanate, or mixtures thereof. More preferred are 4,4'-diisocyanato-dicyclohexylmethane and 4,4'-diisocyanatodiphenylmethane. Most preferred is 4,4'-diisocyanatodiphenylmethane.

Other potential polyisocyanates include triisocyanates such as toluene-2,4,6-triisocyanate and polyisocyanates such as 4,4'-dimethyldiphenylmethane-2,2', 5'5'-tetraisocyanate and the diverse polymethylene polyphenyl polyisocyanates.

One highly preferred isocyanate is an aromatic polyisocyanate based on toluene diisocyanate(TDI) and dissolved in n-butyl acetate such as DESMODUR IL commercially available from Bayer Corporation, Pittsburgh, Pa. Another highly preferred polyisocyanates is a thiophosphate with a isocyanate group such as a solution of tris(p-isocyanatophenyl) -thiophosphate in ethyl acetate sold under the tradename DESMODUR RFE and commercially available from Bayer Corporation, Pittsburgh, Pa.

Preferably, at least one of the isocyanates of the primer composition is a polymethylene poly(phenyl isocyanate), diphenylmethane diisocyanate, or mixture thereof. Preferably, the isocyamate has an NCO equivalent weight of at least about 130, more preferably at least about 133, and most preferably at least about 140; and is preferably no greater than about 500, more preferably no greater than about 300, and most preferably no greater than about 150. The average number of isocyanate groups per molecule of polyisocyanate is preferably at least about 2.4, more preferably at least about 2.7, and most preferably at least about 3.0; and is preferably no greater than about 5.0, more preferably no greater than about 4.0, and most preferably no greater than about 3.5. Preferably, the polyisocyanate comprises a mixture of polymethylene polytphenyl isocyanate) and diphenylmethane diisocyanate. More preferably, the polymethylene poly(phenyl isocyanate) is present in an amount of at least about 10 percent of the polyisocyanate mixture, on a weight basis. Examples of suitable commercially available polyisocyanates include PAF™ 20, PAPI™ 27, and PAPI™ 580, sold by The Dow Chemical Company, Lupranate™ M200, sold by BASF Corporation Chemicals Division, and PBA-2257 and PBA-2262, sold by ICI. Another highly preferred isocyanate is a methylenediphenyl isocyanate solution such as PAPI 2020 commercially available from Dow Chemical Corporation.

In addition, derivatives of 4,4'-diphenylmethane diisocyanate which are liquid at room temperature such as, for example, polyisocyanates which have carbodiimide groups in their backbone or mixtures thereof may also be used. The preparation of these materials is disclosed in U.S. Pat. No. 3,152,162, which is hereby incorporated by reference in its entirety. An example of a commercial material of this type is Isonate™ 143L isocyanate, a product of The Dow Chemical Company.

Catalysts for promoting the reaction of the polyisocyanate with atmospheric moisture and with active hydrogen groups present on the substrate, which is primed may also optionally be included in the primer of the invention. The catalyst may be, for example, a metal complex such as a stannous or stannic compound. Examples include a stannous salt of a carboxylic acid (e.g., stannous octoate, stannous oleate, stannous acetate, and stannous laurate), a trialkyltin oxide, a dialkyltin dicarboxylate (e.g., dibutyltin dilaurate, dibutyltin diacetate, diethyltin diacetate, and dihexyltin diacetate), a dialkyltin dihalide, or a dialkyltin oxide, such as di-2-ethylhexyltin oxide or dioctyltin dioxide, a tertiary amine, or a tin mercaptide. Other catalysts may also be used. For example, tertiary amine catalysts include trialkylamines (e.g., trimethylamine, triethylamine), heterocyclic amines, such as N-alkylmorpholines (e.g. N-methylmorpholine, N-ethylmorpholine, dimethyldiaminodiethyl ethel, etc.), 1,4-dimethylpiperazine, triethylenediamine, etc. Aliphatic polyamines, such as N,N,N',N'-tetramethyl-1,3-butanediamine may also be used as catalysts. One highly preferred catalyst is a mixture of an organic salt of a tertiary amine and a tin compound in an organic solvent. Such a catalyst is sold by Air Products and Chemicals, Inc. under the tradenames Dabco™ DC-2 and Dabco T-9. Other highly preferred catalysts having at least one tin compound include catalysts sold under the tradename FASCAT from the Atofina Chemical Corporation, Philadelphia, Pa. Exemplary FASCAT catalysts include catalyst from the FASCAT 4000 series such as FASCAT 4202.

The solvent component of the primer composition of the invention may be volatile and is preferably a solvent that will dissolve the resin at a temperature in the range of from about 0° C. to about 100° C., more preferably from about 10° C. to about 40° C. and more preferably from about 20° C. to about 25° C. The solvent is preferably anhydrous in order to help prevent the isocyanate from prematurely reacting with water. Examples of such solvents include xylene, methylene chloride, benzene, butyl acetate, monochlorobenzene, trichloroethylene, ethylene chloride, toluene, acetone, and methyl ethyl ketone, and mixtures thereof, and is preferably acetone or methyl ethyl ketone or a mixture thereof. The solvent will comprise the balance the composition and is preferably used in an amount of at least about 50 percent, more preferably at least about 55 percent, and most preferably at least about 60 percent; and is preferably no greater than about 90 percent, more preferably no greater than about 85 percent, and most preferably no greater than about 80 percent, based on the weight of the total primer.

One or more suitable agents (e.g., optical brighteners such as whiteners, fluorescence agents and the like) may be provided in the primer composition for assisting in determining where on a substrate the primer composition has been applied. Preferably, the brightener will include a component that is detectable or visible when exposed to certain types of electromagnetic waves (e.g., light, UV radiation and the like). Examples of optical brighteners include benzoxasols, thiophenates and the like. Examples of preferred optical brighteners include 4,4'-bis(benzoxazol-2-yl)stilbene, 2,5di-5-tert-butylbenzoyl)-thiophenate, 2,2'-(1,2-Ethenediyldi-4,1-phenylene)bisbenzoxazole. One highly preferred optical brightener is a stillbene agent, such as UVITEX OB, commercially available from Ciba Specialty Chemicals, Switzerland.

Optionally, carbon black or another suitable thickener may also be added to the primer of the invention to modify the Theological properties of the primer, such as viscosity, sag resistance, and flow rate. When carbon black is employed, it is preferably used in an amount of at least about 0.5 percent, more preferably at least about 1.0 percent, and most preferably at least about 2.0 percent; and is preferably no greater than about 5.0 percent, more preferably no greater than about 4.0 percent, and most preferably no greater than about 3.0 percent, based on the weight of the total primer formulation.

Other fillers and additives which may also be used to modify the Theological or other properties of the primer include, for example, surface-treated fumed silicas, titanium dioxide, calcium carbonate, talc, defoaming agents, mica, aluminum oxide, clays, and glass phenolic, or aluminum oxide bubbles. Such fillers and additives are preferably anhydrous, or dried before use in order to prevent the reaction of any moisture present with the isocyanate. When talc is added it is preferably used in an amount of at least about 3 percent, and more preferably at least about 5 percent; and is preferably no greater than about 9 percent, and more preferably no greater than about 7 percent, based on the weight of the total primer formulation.

Additives which stabilize the free isocyanate groups present in the primer may also be employed. Such additives include, for example, diethyl malonate, which is preferably employed in an amount of at least about 0.02 percent, more preferably at least about 0.10 percent, and most preferably at least about 0.50 percent; and is preferably no greater than about 5.0 percent, more preferably no greater than about 2.5 percent, and most preferably no greater than about 1.5 percent, based in the weight of the total primer formulation.

In the preparation and storage of the primer, it is preferable to minimize the moisture content of the primer, so that the free isocyanate groups will not react with the water. Additives which may be employed to reduce the free water content of the primer include, for example, molecular sieves which preferably have a pore diameter of about 3 Å. These molecular sieves are preferably added in an amount of at least about 0.01 percent, and more preferably at least about 0.03 percent; and is preferably no greater than about 1.0 percent, and more preferably no greater than about 0.1 percent, based on the weight of the total primer formulation.

Table I below provides precise formulations for three exemplary primer compositions, all of which when applied result in a successful bond, in accordance with the present invention. The compositions are considered exemplary and not meant to limit the invention.

| Composition Ingredients | Formula I (Part by wt.) | Formula II (Parts by wt.) | Formula III (Parts by wt.) |
|---|---|---|---|
| Methyl Ethyl Ketone | 69.66 | 50.29 | 56.90 |
| Ethyl Acetate | | 7.50 | |
| Toluene | | 7.50 | 15.00 |
| Acrylic Resin (Paraloid A-21) | 3.60 | 4.10 | 3.99 |
| Polyester Resin (VITEL 2300 BU) | | | 3.99 |
| MethyleneDiphenyl Isocyanate (PAPI 2020) | 7.79 | 8.88 | 13.63 |
| toluene diisocyanate in n-butyl acetate (DESMODUR IL) | 15.58 | 17.76 | |
| tris(p-isocyanato-phenyl)-thiophosphate in ethyl acetate (DESMODUR RFE) | 3.04 | 3.46 | 6.15 |
| Catalyst (DABCO T-9 and FASCAT 4202) | .30 | .45 | .30 |
| Optical Brightener (UVITEX OB) | 0.03 | 0.05 | 0.04 |

The various ingredients of primer composition may be combined according to a variety of combination protocols. According to one protocol, solvent is provided in a container and the various other ingredients (e.g., resins, isocyanates, catalysts and optical brighteners) are added to the solvent. Subsequently, the ingredients are mixed or agitated to form a substantially clear homogeneous solution. In a preferred embodiment, the ingredients of the primer composition are substantially free of chemical reaction when they are mixed thereby eradicating any steps that might otherwise be required for controlling chemical reactions.

Also in preferred embodiments, the primer compositions can be placed in a container and the container may be left open for extended time periods (e.g. up to 30 days or more), without destroying the composition.

The primer of the invention may be used to prime a substrate for use with any one-component or two component adhesive by applying at least one coat of the primer to the substrate prior to the application of an adhesive. The primer of the invention is especially well adapted for use with a urethane adhesive, particularly a moisture-curable urethane adhesive, and more particularly a "fast cure" urethane adhesive comprised of an isocyanate-functional prepolymer and dimorpholinediethyl ether, of the type which is described, for example, in U.S. Pat. Nos. 4,758,648 and 4,780,520, which are hereby incorporated by reference in their entirety. Other urethane sealants which may be used with the primer of the invention include, for example, sealants of the type described in U.S. Pat. Nos. 3,707,521, 3,779,794, 4,624,996, 4,625,012, 4,758,648, and 4,719,267, which are hereby incorporated by reference in their entirety.

Though, in one particularly preferred aspect of the present invention, the present composition is prepared by dissolving the resin in the solvent and then mixing the remaining ingredients therein, other sequences may be employed. Further, though a single component system is preferred for typical end uses, multi-component systems may also be made, wherein the end user performs a mixing step at or before the time of application.

Although other forms are possible (such as films, tapes, gels, pastes, foams or the like), the primer composition of the present invention is preferably provided for application to a substrate as a liquid, which preferably has a density of about 0.6 to about 1.3 kg/l (about 5 to about 11 lb/gal) and more preferably about 0.8 to about 1.1 kgA (about 7to about 9 lb/gal) before application. In another aspect of the invention, the primer is admixed with an adhesive or other suitable coating prior to applying such coating to a substrate.

The primer is applied to a surface of a substrate using suitable art-disclosed techniques, including but not limited to brushing, rolling, dipping, dripping, extruding, curtain coating, swabbing, spraying or the like. After application, the mixture forms a tenacious coating upon solvent evaporation, and substantially completely cures upon exposure to atmospheric moisture.

Though other substrates may be coated therewith, the primer composition of the present invention has exhibited particular utility in promoting bonding between urethane adhesives and plastic substrates for forming plastic/primer/coating laminates, such as plastic/primer/adhesive laminates. The primer has use for bonding plastics such as thermoplastics, thermosets, elastomers (thermoplastic, thermoset, natural rubber or other rubbers), plastomers, or the like. Advantageously, the primer composition of the present invention has been shown particularly to increase the strength of urethane adhesive bonding to such plastics as those that include plastics with high solid content, a high plasticizer content, mold release agents or a combination thereof. In highly preferred embodiments, the primer composition advantageously assists urethane adhesives in bonding to plastics that. include polyvinylchloride (PVC), polyurethane (e.g., such as that employed in reaction injection molded (RIM) plastics), polyolefins, polystyrenes, EPDM or the like.

Adhesive joints bonded with the primer of the present invention exhibit tensile stresses of at least about 15 kg/cm2, and more preferably at least about 30 kg/cm2 and still more preferably at least about 50 kg/cm2. The strength of the adhesive joint preferably is sufficient for exhibiting a failure mode of cohesive failure in the adhesive as opposed to adhesive failure. In one embodiment, the strength of the adhesive joint exceeds the strength of a plastic substrate to which it is bonded.

The present composition finds particularly attractive application in the transportation and construction industries, especially in structures requiring transparent sheet (e.g., glass) bonding or encapsulation of transparent sheets. The primer composition may be employed to assist in bonding the encapsulating material to the transparent sheet, the encapsulating material to another surface (e.g., the surface to which the encapsulated assembly is attached), to bond the transparent sheet directly to another surface in the absence of encapsulation, or a combination thereof. The encapsulation may be attached to one or more surfaces of a transparent sheet or another surface and may be continuous or include spaced apart portions. As an example, an encapsulation for a glass sheet may include a seal having arms connected by a web. In alternative embodiments, one of the arms, the web or a combination thereof may be omitted, In one highly preferred embodiment, and with reference to FIG. 1, there is illustrated an exemplary structure 10 using the primer composition of the present invention in an automotive vehicle for an encapsulated window assembly. The structure 10 includes a, glass component 12, which is preferably a window (e.g., a windshield, of the automotive vehicle and a seal 16 (shown as including opposing arms connected by a web), which preferably frames all or a portion of the window, on one or more of its sides, and is preferably formed of a plastic, such as PVC or a RIM plastic. The structure 10 also includes a vehicle body panel 20, and an adhesive layer 24 bonded to the body panel 20 wherein the adhesive is preferably one of the urethane adhesives discussed above. A primer layer 28 of the primer compostion is disposed intermediate the adhesive layer 24 and the seal 16.

The primer layer 28 is applied to the structure 10 to form a dry layer thickness on the order of at least about 0.001 mm, and more preferably to about 0.01 to about 0.05 mm. Thereafter, the adhesive layer 24 is applied intermediate the metal component 20 and the primer layer 28 allowing a strong bond to be formed between the glass component 12 and the body panel 20, and more particularly between the primer layer 28 and the plastic component 16.

Of course, other single-sided or multi-sided encapsulation techniques may be employed using the primer composition of the present invention, wherein the primer is applied to the seal, the transparent sheet or both, including for instance employing injection molded, extruded or die cut seals. Alternatively, the seal might be molded or extruded directly into place onto the transparent sheet. Further still, the seal might be omitted in favor of a suitable adhesive composition. The seal may be entirely omitted from an exterior surface of the transparent sheet, such as for creating a smooth appearance.

Application of the primer may be performed as part of the manufacture and assembly of original equipment for the intended application. Application of the primer may also be performed as part of a repair or replacement of equipment, such as the of replacement of an automotive vehicle window. Accordingly, in another embodiment, the primer of the present invention may be packaged as part of a kit that includes ori or a combination of two or more of an applicator, an adhesive, a mixer, a seal, decorative trim, cleaner or the like.

The present invention is not limited to transparent sheets of one material type. The sheets may include plural materials or layers of different materials (e.g., glass/plastic laminates). The sheets may be glazed or otherwise treated (such as for imparting tint or otherwise constantly or variably reflecting, diffracting, refracting or absorbing light). The sheets may include additional structural or functional features such as rigid frames, handles, latches, regulators, filaments or other suitable structure for beating, antennae or the like, or otherwise.

It should be understood that the invention is not limited to the exact embodiment or construction, which has been illustrated and described but that various changes may be made without departing from the spirit and scope of the invention.

What is claimed is:

1. A method for priming a surface for a urethane adhesive, comprising the steps of: providing a primer composition comprising:
   i) an acrylic resin wherein said resin is present in an amount of about 2 to about 10 parts by weight of said primer composition;
   ii) an isocyanate in an amount of about 3 to about 30 parts by weight of said primer composition;
   iii) a catalyst in an amount up to about 2 parts by weight of said primer composition; and
   iv) a solvent; and contacting said primer composition with a plastic substrate.

2. A method as in claim 1, further comprising: contacting a urethane adhesive with said primer composition.

3. A method as in claim 2, further comprising: adhering said urethane adhesive to a second substrate.

4. A method as in claim 3, wherein said second substrate is an automotive vehicle body member.

5. A method as in claim 1, wherein at least a portion of said resin is a methacrylate.

6. A method as in claim 1, wherein the isocyanate comprises a polyisocyanate.

7. A method as in claim 6, wherein at least a portion of the polyisocyanate is a thiophosphate with an isocyanate group.

8. A method as in claim 1, wherein said primer composition includes an agent for allowing detection of the primer composition on the substrate, said detection agent present in about 0.001 to about 1 parts by weight of said primer composition.

9. A method as in claim 8, wherein said agent is an optical brightener.

10. A method as in claim 9, wherein said agent is a fluorescent agent.

11. A method as in claim 1, wherein the primer composition further comprises a polyester resin.

12. A method for bonding a plastic substrate at least partially encapsulating a transparent sheet, comprising the steps of: providing a transparent sheet assembly including a transparent sheet at least partially encapsulated with a plastic seal; contacting said plastic seal with a primer composition comprising:
   i) an acrylic resin wherein said resin is present in an amount 2 parts to about 10 parts by weight of said primer composition;
   ii) an isocyanate in an amount up to about 3 to about 30 parts by weight of said primer composition;
   iii) a catalyst in an amount of about 0.05 to about 2 by weight of said primer composition; and
   iv) a solvent; and contacting said primer composition with a polyurethane adhesive; contacting said polyurethane adhesive with an automotive vehicle member for bonding said transparent sheet assembly to said automotive vehicle member.

13. A method as in claim 12, wherein at least a portion of said resin is a methacrylate.

14. A method as in claim 12, wherein the isocyanate comprises a polyisocyanate.

15. A method as in claim 14, wherein at least a portion of the polylsocyanate is a thiophosphate with an isocyanate group.

16. A method as in claim 12, wherein said primer composition includes an agent for allowing detection of the primer composition on the substrate, said detection agent present in about 0.001 to about 1 parts by weight of said primer composition.

17. A method as in claim 16, wherein said agent is an optical brightener.

18. A method as in claim 12, wherein said automotive vehicle body member is a body panel.

19. A method as in claim 12, wherein said transparent sheet is a windshield of an automotive vehicle.

20. A method as in claim 12, wherein at least a portion of said solvent is methyl ethyl ketone.

21. A method as in claim 12, wherein the primer composition further comprises a polyester resin.

* * * * *